(12) United States Patent
Macaraeg

(10) Patent No.: US 10,414,358 B2
(45) Date of Patent: Sep. 17, 2019

(54) COMPOSITE PANEL POWER SYSTEM

(71) Applicant: The Boeing Company, Chicago, IL (US)

(72) Inventor: Sesinando Prado Macaraeg, Everett, WA (US)

(73) Assignee: The Boeing Company, Chicago, IL (US)

( * ) Notice: Subject to any disclaimer, the term of this patent is extended or adjusted under 35 U.S.C. 154(b) by 332 days.

(21) Appl. No.: 15/014,381

(22) Filed: Feb. 3, 2016

(65) Prior Publication Data
US 2017/0217389 A1  Aug. 3, 2017

(51) Int. Cl.
| B60L 1/00 | (2006.01) |
| B60R 16/033 | (2006.01) |
| H01M 10/04 | (2006.01) |
| H01M 10/44 | (2006.01) |
| H01M 10/46 | (2006.01) |
| H02J 7/00 | (2006.01) |
| B64D 41/00 | (2006.01) |

(Continued)

(52) U.S. Cl.
CPC ............ *B60R 16/033* (2013.01); *B64D 41/00* (2013.01); *H01M 2/1066* (2013.01); *H01M 2/1072* (2013.01); *H01M 10/0413* (2013.01); *H01M 10/44* (2013.01); *H01M 10/46* (2013.01); *H02J 7/0052* (2013.01); *B64C 1/066* (2013.01); *B64D 47/02* (2013.01); *B64D 2203/00* (2013.01); *B64D 2221/00* (2013.01); *H01M 2220/20* (2013.01); *Y02T 50/44* (2013.01); *Y02T 50/53* (2013.01)

(58) Field of Classification Search
CPC ...... H01L 2924/00; H01L 2924/00014; H01G 9/15
See application file for complete search history.

(56) References Cited

U.S. PATENT DOCUMENTS

| 8,741,486 B1 | 6/2014 | Jacobsen et al. |
| 9,072,184 B2 | 6/2015 | Aston |

(Continued)

FOREIGN PATENT DOCUMENTS

| CN | 103959539 A | 7/2014 |
| WO | 2015101648 A1 | 7/2015 |

OTHER PUBLICATIONS

Extended European Search Report, dated Jun. 9, 2017, regarding Application No. 16197776.4, 8 pages.

(Continued)

*Primary Examiner* — Sibin Chen
(74) *Attorney, Agent, or Firm* — Yee & Associates, P.C.

(57) ABSTRACT

An embodiment of the present disclosure provides a method and apparatus for supplying an electrical current. The method comprises sending the electrical current into a device from a panel comprising a dielectric core. Further, the method comprises a first sheet with a first conductive adhesive attaching the first sheet to a first side of the dielectric core, wherein the first conductive adhesive is a first electrode for a battery. Yet further, the method comprises a second sheet with a second conductive adhesive attaching the second sheet to a second side of the dielectric core, wherein the second conductive adhesive is a second electrode for the battery. Still further, the method comprises operating the device using the electrical current from the battery in the panel.

20 Claims, 10 Drawing Sheets

(51) Int. Cl.
*H01M 2/10* (2006.01)
*B64C 1/06* (2006.01)
*B64D 47/02* (2006.01)

(56) References Cited

U.S. PATENT DOCUMENTS

| | | |
|---|---|---|
| 2003/0038610 A1 | 2/2003 | Munshi et al. |
| 2005/0023542 A1* | 2/2005 | Fujiwara .................. G01J 1/46 |
| | | 257/80 |
| 2010/0134947 A1* | 6/2010 | Goudy, Jr. ............... H01G 2/08 |
| | | 361/274.2 |
| 2011/0281717 A1* | 11/2011 | Krishna ................ C04B 35/462 |
| | | 501/137 |
| 2014/0029158 A1* | 1/2014 | Inoue ....................... H01G 4/30 |
| | | 361/301.4 |
| 2015/0044572 A1 | 2/2015 | Hucker et al. |
| 2015/0093629 A1 | 4/2015 | Sayre et al. |
| 2015/0351181 A1* | 12/2015 | Huang ............... H05B 33/0821 |
| | | 315/188 |
| 2016/0040469 A1* | 2/2016 | Lietz .................... E05F 15/668 |
| | | 49/13 |

OTHER PUBLICATIONS

European Examination Report, dated Apr. 3, 2018, regarding Application No. EP16197776.4, 4 pages.

\* cited by examiner

COMPOSITE PANEL POWER SYSTEM

BACKGROUND INFORMATION

1. Field

The present disclosure relates generally to aircraft and, in particular, to power systems in aircraft. Still more particularly, the present disclosure relates to a method and apparatus for a battery in a composite panel for an aircraft.

2. Background

Aircraft are being designed and manufactured with greater and greater percentages of lighter weight materials. For example, panels are commonly used in the interiors of aircraft. Panels may be used to form walls, ceilings, floors, closets, doors, and other structures in an aircraft.

The panels used in aircraft are often composite panels. For example, a composite panel may be a sandwich composite panel. The basic structure is comprised of three main layers: a core between two relatively thin outer layers. The core typically has a low density, such as a honeycomb core. The outer layers are typically a pre-impregnated resin fiber weave.

This type of structure is able to receive shear loads while the outer layers may receive in plane stresses in a desired manner. As a result, these types of composite panels may have a high bending stiffness with a lower density and weight as compared to other types of composite panels.

Further, decorative laminates are often placed on composite panels used for walls in the interior of the aircraft to provide aesthetics, information or directions, or some combination thereof. With the increasing use of organic light emitting diode (OLED) displays, these displays may also be attached to the composite panels.

Additionally, the composite panels also may be used in structures, such as stowage bins, cabinets, and doors. Further devices, such as lights, electromechanical locks, and other devices, may be formed in the composite panels.

With the number of different devices that use electrical power, a technical problem is present with providing power to the increased number of devices in an aircraft. The increased use of these devices in the interior of an aircraft increases the power use in the aircraft. In supplying power to these devices, power lines are used to connect the devices in the aircraft's power system.

For example, if each storage bin in an aircraft has an electromechanical latch, providing power to operate these latches increases the number of wires needed in the aircraft. As another example, if organic light emitting diode displays are used on composite panels for the walls, ceilings, doorways, or other locations, wires are used to connect these organic light emitting diode displays to the power system in the aircraft.

Thus, as the number of devices associated with composite panels increases, the amount of power and the complexity of supplying power to these devices increase. Additionally, the weight of the aircraft increases with the increased use of these devices and wiring systems needed to connect the devices to power systems.

Providing power to these devices may be more difficult and costly than desired. For example, the use of wires to connect devices to power systems adds to the cost and the weight of the aircraft. Further, the wires also increase the time and complexity in assembling the aircraft, resulting in increased production time and costs to manufacture the aircraft. Additionally, the amount of power that can be supplied from the power systems in the aircraft is limited. As a result, a larger auxiliary power unit, an additional auxiliary power unit, additional batteries, or other types of power supplies may be needed in the aircraft, which also increase the weight and the cost of the aircraft.

Therefore, it would be desirable to have a method and apparatus that take into account at least some of the issues discussed above, as well as other possible issues. For example, it would be desirable to have a method and apparatus that overcome a technical problem with providing power to devices associated with composite panels in an aircraft.

SUMMARY

An embodiment of the present disclosure provides an apparatus. The apparatus comprises a dielectric core; a first sheet with a first conductive adhesive attaching the first sheet to a first side of the dielectric core, wherein the first conductive adhesive is a first electrode for a battery; and a second sheet with a second conductive adhesive attaching the second sheet to a second side of the dielectric core, wherein the second conductive adhesive is a second electrode for the battery, wherein the dielectric core, the first sheet, and the second sheet form a panel.

Another embodiment of the present disclosure provides a method for supplying an electrical current. The method comprises sending the electrical current into a device from a panel comprising a dielectric core. Further, the method comprises a first sheet with a first conductive adhesive attaching the first sheet to a first side of the dielectric core, wherein the first conductive adhesive is a first electrode for a battery. Yet further, the method comprises a second sheet with a second conductive adhesive attaching the second sheet to a second side of the dielectric core, wherein the second conductive adhesive is a second electrode for the battery. Still further, the method comprises operating the device using the electrical current from the battery in the panel.

Yet another embodiment of the present disclosure provides an aircraft panel. The aircraft panel comprises a honeycomb core that has dielectric properties. Further, the aircraft panel comprises a first sheet with a first conductive adhesive attaching the first sheet to a first side of the honeycomb core, wherein the first conductive adhesive is a first electrode for a battery. Yet further, the aircraft panel comprises a second sheet with a second conductive adhesive attaching the second sheet to a second side of the honeycomb core, wherein the second conductive adhesive is a second electrode for the battery, wherein the battery is part of a composite panel.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account that supplying power to a device, such as an organic light emitting diode display, currently involves running wires through a panel or panels from a power system to the organic light emitting diode display. The power system may be, for example, an auxiliary power supply or a battery in another location in an aircraft.

The illustrative embodiments recognize and take into account that supplying power to a device, such as an organic light emitting diode display, currently involves running wires through a panel or panels from a power system to the organic light emitting diode display. The power system may be, for example, an auxiliary power supply or a battery in another location in an aircraft.

The illustrative embodiments recognize and take into account that running wires to and through panels may not provide a desired solution. The illustrative embodiments recognize and take into account that running wires through the panel involves cutting channels in the core. Placing the wires in the channels and then filling the channels with epoxy or a potting material adds to the complexity of manufacturing the panel. The outer layers may then be bonded to the core. The illustrative embodiments recognize and take into account that this solution requires additional time to manufacture the panel.

Further, the illustrative embodiments also recognize and take into account that this solution also increases the weight of the aircraft. The use of wires, a potting material, and other materials, in addition to those used for the panel, increases the weight of the panel, which in turn increases the weight of the aircraft.

Thus, the illustrative embodiments provide a method and apparatus to supply power to devices associated with panels. In one illustrative example, a panel comprises a dielectric core, a first sheet with a first conductive adhesive, and a second sheet with a second conductive adhesive. The first sheet with the first conductive adhesive attaches the first sheet to a first side of the dielectric core. The first conductive adhesive is a first electrode for a battery. The second sheet with the second conductive adhesive attaches the second sheet to a second side of the dielectric core. The second conductive adhesive is a second electrode for the battery. The dielectric core, the first sheet with the first adhesive, and the second sheet with the second adhesive form a panel.

Figure 1:
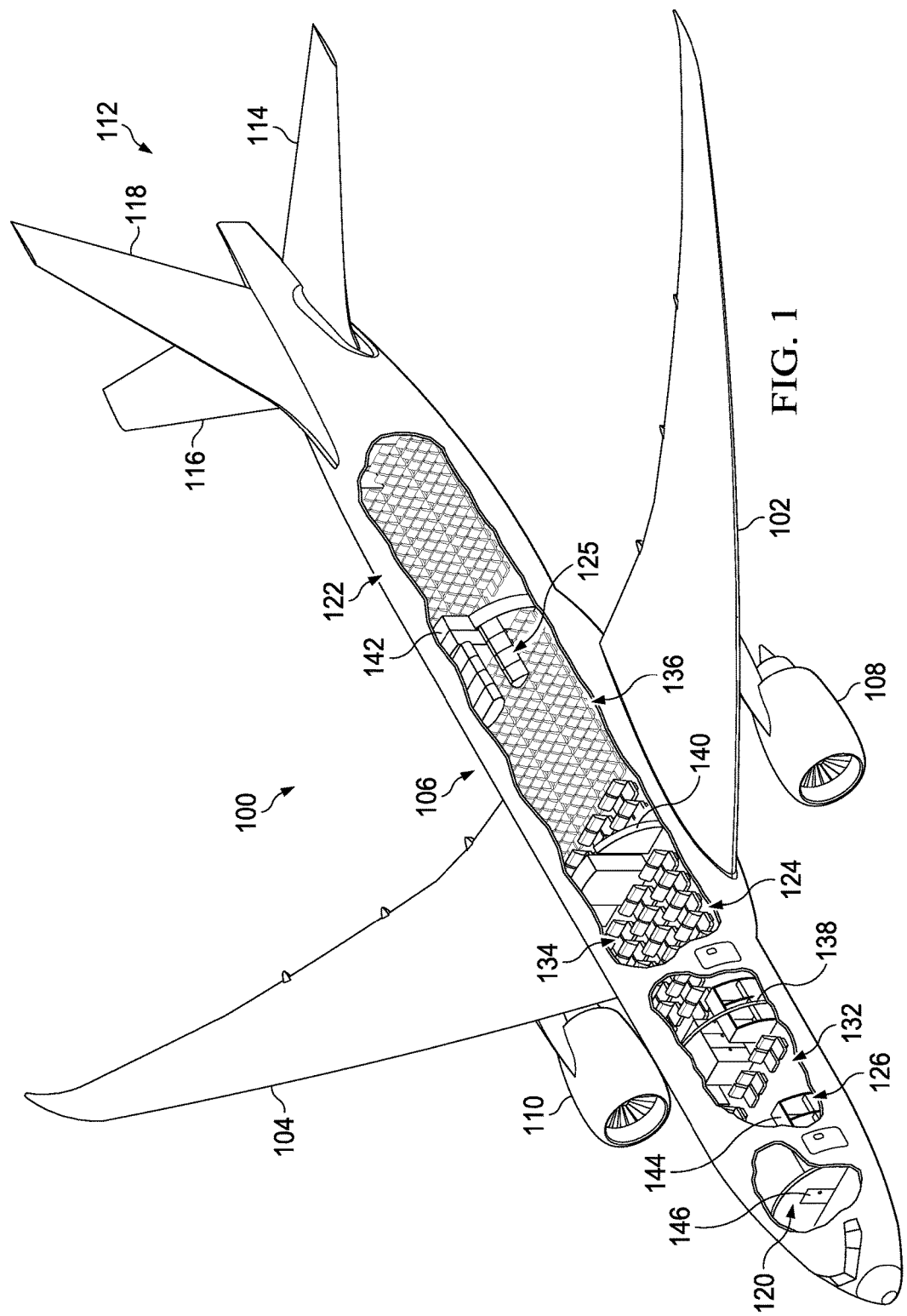
FIG. 1 is a pictorial illustration of an aircraft in accordance with an illustrative embodiment.

With reference now to the figures and, in particular, with reference to FIG. 1, a pictorial illustration of an aircraft is depicted in accordance with an illustrative embodiment. In this example, aircraft 100 has wing 102 and wing 104 attached to fuselage 106. Aircraft 100 also includes engine 108 attached to wing 102 and engine 110 attached to wing 104.

Fuselage 106 has aft section 112. Aft section 112 is the tail section of fuselage 106 in this illustrative example. Horizontal stabilizer 114, horizontal stabilizer 116, and vertical stabilizer 118 are attached to aft section 112 of fuselage 106.

Fuselage 106 also has cockpit 120 and passenger cabin 122. In this example, passenger cabin 122 may include passenger seating in seating area 124. Seating area 124 may include a number of aircraft seats. As used herein, "a number of" items means one or more items. For example, "a number of aircraft seats" means one or more aircraft seats.

Further, seating area 124 in passenger cabin 122 also includes storage areas, such as a number of overhead compartments in the form of stowage bins 125. In this illustrative example, passenger cabin 122 also may include lavatory 126.

As depicted in this figure, seating area 124 is divided into first-class seating 132, business class seating 134, and economy seating 136. These areas may be separated from each other by partitioning structures in the form of bulkhead 138, bulkhead 140, and bulkhead 142. In this particular example, bulkhead 142 divides economy seating 136 in seating area 124.

Composite panels may be used in various locations within aircraft 100. For example, composite panels may be used for walls 144 for lavatory 126. Door 146 also may be formed using composite panels. Bulkhead 138, bulkhead 140, and bulkhead 142 may be formed using composite panels. As another example, stowage bins 125 include composite panels.

In the illustrative example, one or more of the different composite panels may include a number of batteries. These batteries are formed as part of the composite panels for one or more of these different interior components in aircraft 100. The batteries may be used to power line replaceable units that are associated with the composite panels.

When one component is "associated" with another component, the association is a physical association. For example, a first component, such as a line replaceable unit, may be considered to be physically associated with a second component, such as a composite panel, by at least one of being secured to the second component, bonded to the second component, mounted to the second component, welded to the second component, fastened to the second component, or connected to the second component in some other suitable manner. The first component also may be connected to the second component using a third component. The first component may also be considered to be physically associated with the second component by being formed as part of the second component, an extension of the second component, or both.

Figure 2:
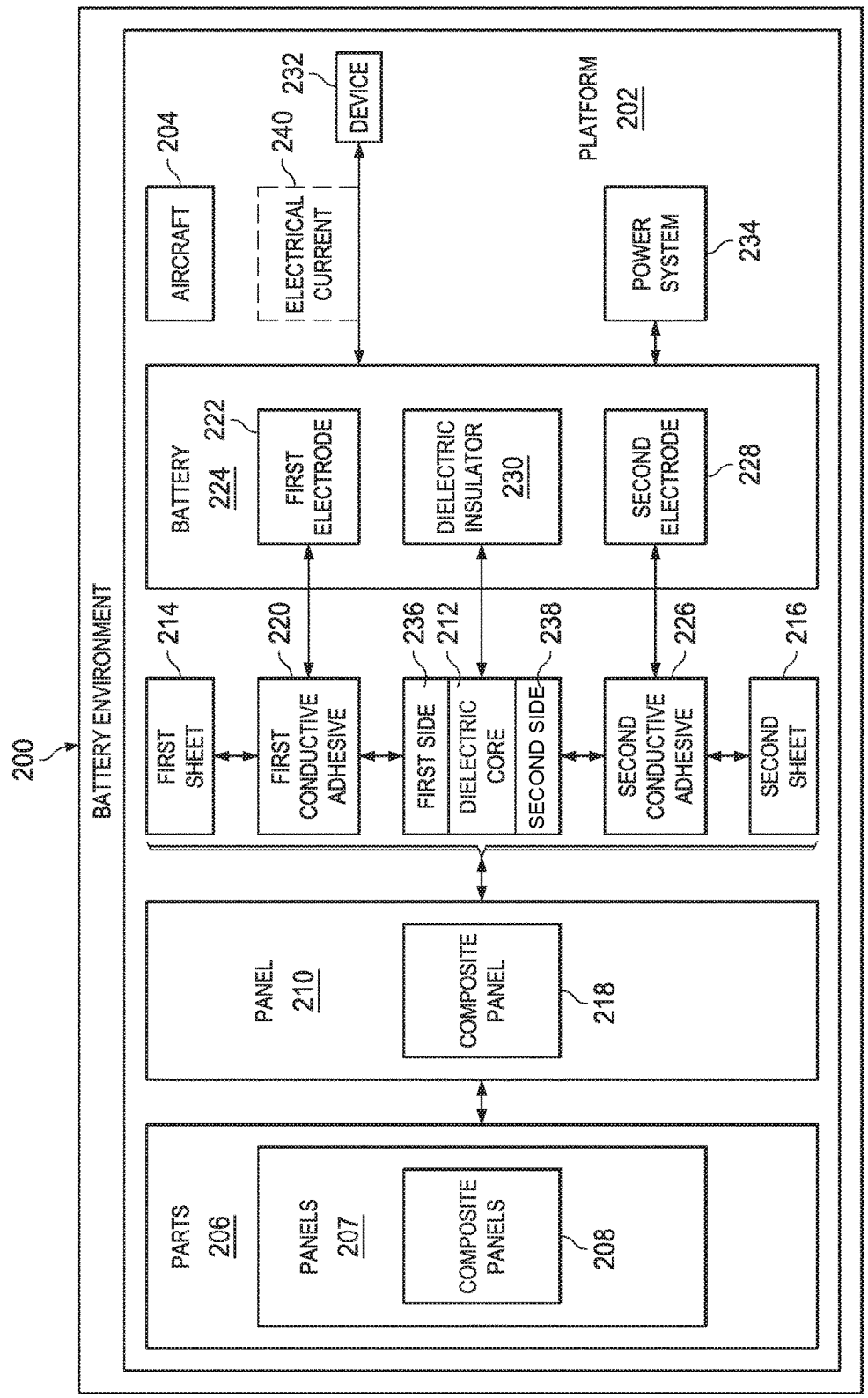
FIG. 2 is an illustration of a block diagram of a battery environment in accordance with an illustrative embodiment.

With reference next to FIG. 2, an illustration of a block diagram of a battery environment is depicted in accordance with an illustrative embodiment. In this illustrative example, battery environment 200 includes platform 202. In this illustrative example, platform 202 takes the form of aircraft 204. Aircraft 100 in FIG. 1 is an example of one implementation of aircraft 204.

As depicted, platform 202 is comprised of parts 206. Parts 206 may take various forms. For example, parts 206 may be selected from at least one of a wall, a door, a partition, a bulkhead, a floor, a ceiling, a closet, a lavatory, a cabinet, a stowage bin, or some other suitable type of part.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, thing, or category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In the illustrative example, parts 206 include panels 207. Panels 207 may take the form of composite panels 208. Composite panels 208 include a number of layers that are formed from a composite material.

In the illustrative example, the composite material is a reinforced plastic, such as a fiber reinforced polymer. In other words, fibers in which a resin is present. For example, fibers may include at least one of fiberglass, carbon fiber, para-aramid synthetic fibers, or other suitable types of fibers. These fibers may be woven into a fabric. The resin may be, for example, a polymer resin, a shape memory polymer resin, or some other suitable type of resin that provides desired properties for composite panels 208.

In the illustrative example, panel 210 in panels 207 may form a part in parts 206. For example, panel 210 may form at least part of a structure in parts 206 selected from one of an interior wall, a ceiling, an overhead stowage bin, a door, a closet, a sidewall, a partition, a floor, or some other suitable structure.

As depicted, panel 210 in panels 207 includes dielectric core 212, first sheet 214, and second sheet 216. In these illustrative examples, first sheet 214 and second sheet 216 are attached to dielectric core 212. In this illustrative example, when composite materials are used to form at least one of first sheet 214 or second sheet 216, panel 210 takes the form of composite panel 218.

Further, first sheet 214 has first conductive adhesive 220 attaching first sheet 214 to first side 236 of dielectric core 212. First conductive adhesive 220 forms first electrode 222 for battery 224. Second sheet 216 has second conductive adhesive 226 attaching second sheet 216 to second side 238 of dielectric core 212. Second conductive adhesive 226 forms second electrode 228 for battery 224. In this illustrative example, dielectric core 212 forms dielectric insulator 230 for battery 224.

In this manner, first conductive adhesive 220, second conductive adhesive 226, and dielectric core 212 form battery 224. As depicted, battery 224 is integrated as part of panel 210. Further, the formation of battery 224 does not require additional components that may add undesired weight or bulk to panel 210. For example, wires, potting material, and other materials that may be needed to run wires may be avoided.

As depicted, a conductive adhesive is used in place of a normal adhesive typically used in panels. An adhesive is any material that binds two objects together and resists separation of the two objects from each other. The adhesive may be comprised of a material that binds or adheres objects together that are of a different or same make-up and develops strength along the joined surfaces of the objects. The adhesive may be selected from one of glue, epoxy, cement, mucilage, paste, or some other suitable material.

A conductive adhesive is any adhesive that contains conductive material within the adhesive. The conductive material may be suspended, or otherwise contained, within the adhesive. The conductive material may be selected from at least one of a metal, an alloy, silver, copper, gold, a semi-metal, or graphite/carbon. The conductive material may have a form selected from at least one of nano-particles, fibers, granules, strands, nodules, filaments, or other suitable forms.

The composition of conductive materials used in first conductive adhesive 220 and second conductive adhesive 226 may depend on various factors. For example, if resistance to corrosion is desired, the material for the conductive adhesive may be based on that factor.

For example, gold may be used when resistivity to corrosion is desired. For efficiency, silver may be used. For cost, copper may be selected. In a similar fashion, the shape of the conductive materials is also selected based on various factors, such as cost, thickness of the adhesive layer, or other suitable factors.

In the illustrative example, device 232 may be electrically connected to battery 224. In particular, device 232 may be electrically connected to first electrode 222 and second electrode 228. This connection allows electrical current 240 to flow between device 232 and battery 224 in a manner that supplies power to allow device 232 to operate.

The electrical connection is direct or indirect. For example, device 232 may be directly connected to battery 224 through conductive lines. In other illustrative examples, device 232 may be connected to battery 224 through at least one of an amplifier, a switch, a diode, or some other suitable component.

As depicted, device 232 may take various forms. In the illustrative example, device 232 is a hardware component that uses electrical power. For example, device 232 may be selected from one of a line replaceable unit, a light, an organic light emitting diode display panel, an electromechanical switch, a smart glass window, or some other suitable component.

Device 232 may be located in panel 210, another panel, or in some other suitable location. For example, device 232 may be a light integrated into panel 210 that forms part of a wall. In another illustrative example, device 232 may be an electromechanical switch integrated into panel 210 as part of a stowage bin for aircraft 204.

Further, power system 234 may also be electrically connected to battery 224. Power system 234 functions to charge battery 224. Power system 234 may take various forms. For example, power system 234 may be selected from at least one of an energy harvesting system, a battery, an auxiliary power source, or some other suitable type of power source.

When power system 234 takes the form of an energy harvesting system, the energy harvesting system may use various mechanisms to generate energy. For example, the energy harvesting system may be selected from at least one of a solar cell, a thermoelectric generator, a micro wind turbine, or some other suitable mechanism.

In the illustrative example, dielectric core 212 acts as an insulator between first conductive adhesive 220 and second conductive adhesive 226. In other words, the materials and structure of dielectric core 212 are such that a current does not flow between first conductive adhesive 220 and second conductive adhesive 226 through dielectric core 212.

Figure 3:
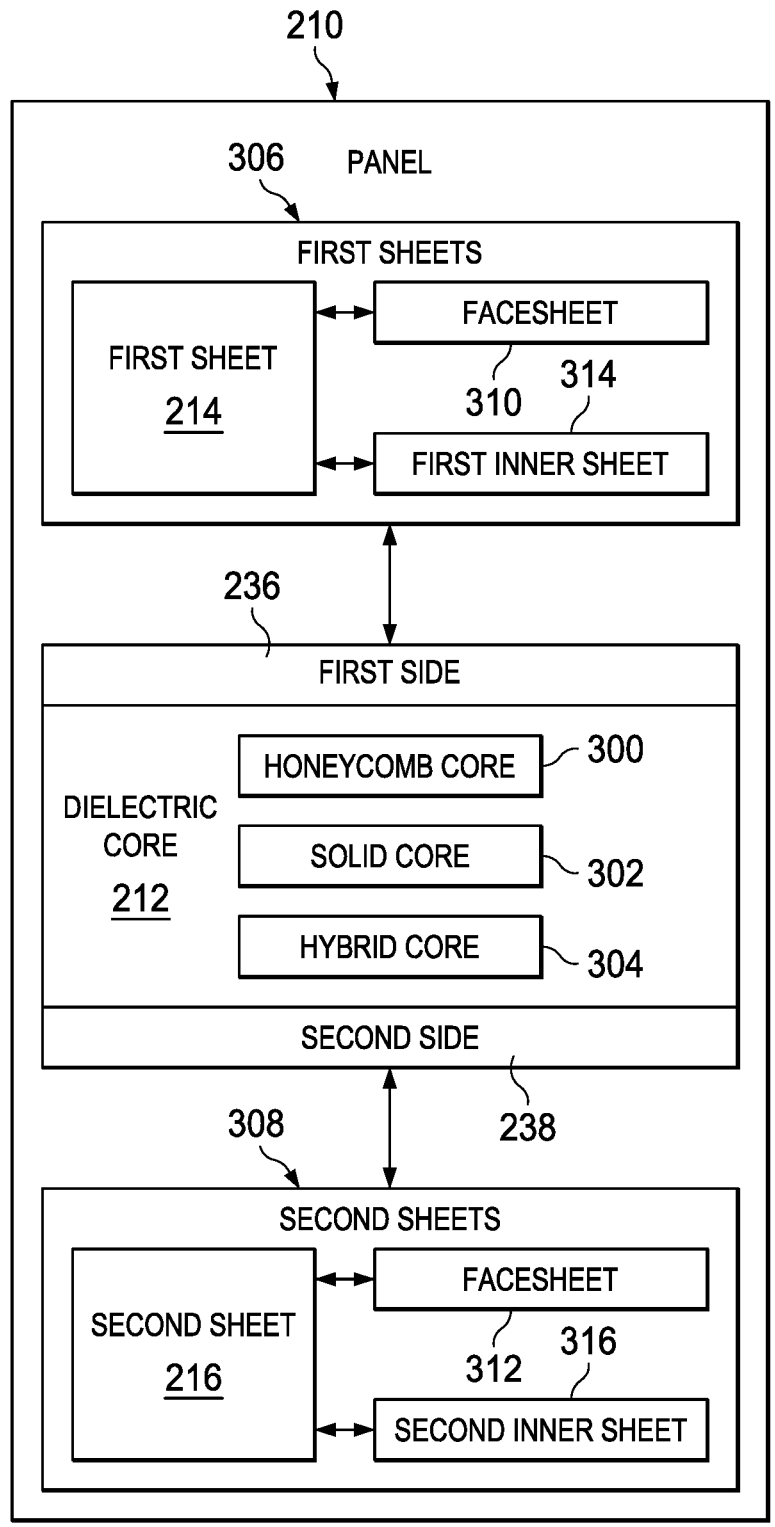
FIG. 3 is an illustration of a block diagram of a panel in accordance with an illustrative embodiment.

With reference next to FIG. 3, an illustration of a block diagram of a panel is depicted in accordance with an illustrative embodiment. In the illustrative examples, the same reference numeral may be used in more than one figure. This reuse of a reference numeral in different figures represents the same element in the different figures.

In this figure, a more detailed illustration of panel 210 in FIG. 2 is shown. As depicted, dielectric core 212 may take different forms. For example, dielectric core 212 may be honeycomb core 300, solid core 302, hybrid core 304, or take some other suitable form.

Honeycomb core 300 is a structure having a volume and a shape that is selected based on the use for panel 210. For example, honeycomb core 300 may have a shape selected from one of flat, curved, contoured, or some other suitable shape. For example, a flat shape may be used for a door or a wall. A curved shape may be used for a stowage bin or some other similar structure. Honeycomb core 300 is selected to have structural rigidity and resistance to changes of at least one of the shape or the volume based on the use for panel 210.

Honeycomb core 300 is comprised of an array of cellular hollow cells. In the illustrative example, honeycomb core 300 may have cells that are columnar and hexagonal in shape. The materials used may be selected such that honeycomb core 300 functions as an electrical insulator. For example, the materials may be selected from at least one of a metallic material, a nonmetallic material, an alloy, a composite, cardboard, phenolic resin coated paper, a plastic material, fiberglass, or other suitable materials. When materials in honeycomb core 300 are conductive, facesheets may be used on either side of honeycomb core 300 that are nonconductive in a manner that causes honeycomb core 300 to function as an electrical insulator when combined with the facesheets. In this manner, honeycomb core 300 may function as an electrical insulator when combined with the facesheets. Other types of dielectric core 212, such as solid core 302 and hybrid core 304, also may be configured to function as an electrical insulator using facesheets or in some other suitable manner.

Honeycomb core 300 may be used to reduce the amount of material in panel 210. In this manner, the weight of panel 210 may be reduced while maintaining or increasing the structural composite properties of honeycomb core 300. With the use of honeycomb core 300, the weight of panel 210 may be reduced as compared to using other types of cores.

Solid core 302 is a structure that is comprised of a single material in a solid layer. Solid core 302 may be selected to have a volume and a shape with structural rigidity and resistance to changes of at least one of the shape or the volume based on the use for panel 210.

The material for solid core 302 is selected such that solid core 302 functions as an electrical insulator. For example, solid core 302 may be comprised of a metallic material, a non-metallic material, a plastic material, an alloy, a composite material, a polycarbonate, or some other suitable type of material. Facesheets that have insulative properties may be used when the material in solid core 302 is conductive such that solid core 302 with the facesheets functions as an electrical insulator. Using solid core 302 may be desirable when panel 210 is part of a structure with detailed parts or components that protrude or extend beyond any of a flat, curved, or contoured surface.

In the illustrative example, hybrid core 304 is a structure that has a volume and a shape with structural rigidity and resistance to changes of at least one of the shape or the volume based on the use for panel 210. Hybrid core 304 is formed from a combination of materials. The selection of the materials is such that hybrid core 304 functions as an electrical insulator.

For example, hybrid core 304 may be selected from a combination of two or more of a metallic material, a non-metallic material, an alloy, a composite material, a plastic material, or some combination of these or other materials. For example, the material in hybrid core 304 may be a metal infused plastic. Facesheets that have insulative properties may be used when the material in hybrid core 304 is conductive such that hybrid core 304 with the facesheets functions as an electrical insulator.

In the illustrative example, hybrid core 304 may be formed from multiple layers. The different layers may be comprised of different materials. These different layers in hybrid core 304 may have different densities in the illustrative example.

Further, hybrid core 304 may be a single layer of material that has features located within a layer of material. These features may be, for example, voids or cells. In one illustrative example, hybrid core 304 may be a plastic foam, a polycarbonate with cells, or some other suitable form. In another illustrative example, hybrid core 304 may be a single layer that is modified at a molecular-level to change material properties to reduce the weight of hybrid core 304.

Using hybrid core 304 may be desirable when panel 210 is part of a structure with detailed parts or components that protrude or extend beyond any of a flat, curved, or contoured surface. The weight of hybrid core 304 may be less than using solid core 302 with the same volume and size.

As depicted, a number of first sheets 306 are attached to first side 236 of dielectric core 212. A number of second sheets 308 are attached to second side 238 of dielectric core 212. In this illustrative example, the number of first sheets 306 includes first sheet 214. The number of second sheets 308 includes second sheet 216.

The number of first sheets 306 may include one or more other sheets in addition to first sheet 214. In a similar manner, the number of second sheets 308 may also include one or more other sheets in addition to second sheet 216. For example, depending on what other sheets are present in the number of first sheets 306 and the number of second sheets 308, first sheet 214 and second sheet 216 may be selected from one of an inner sheet, an outer sheet, a laminate, a decorative laminate, a composite layer, or some other suitable type of sheet.

For example, first sheet 214 may be facesheet 310 on first side 236 of dielectric core 212, and second sheet 216 may be facesheet 312 on second side 238 of dielectric core 212. With this type of configuration, the number of first sheets 306 also may include first inner sheet 314 and the number of second sheets 308 may include second inner sheet 316. First inner sheet 314 is located between facesheet 310 and dielectric core 212, and second inner sheet 316 is located between facesheet 312 and dielectric core 212.

In yet another example, the adhesive on a sheet may not all be comprised of a conductive adhesive. Instead, a combination of areas of conductive adhesive and nonconductive adhesive may be used. The regions may be formed through various techniques, such as screen printing or serigraph printing. The amount of conductive adhesive may depend on the voltage desired to be generated. Additionally, if the amount of power can be supplied to a smaller area of conductive adhesive forming a battery than all of the panel, that smaller area may be used to reduce the amount of heat generated.

The illustration of battery environment 200 and the different components in battery environment 200 in FIG. 2 and FIG. 3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Although the illustrative example in FIG. 1 is described with respect to platform 202 in the form of aircraft 204, other illustrative examples may be applied to other types of platforms. For example, platform 202 may be a mobile platform, a stationary platform, a land-based structure, an aquatic-based structure, or a space-based structure. More specifically, the platform may be a surface ship, a tank, a personnel carrier, a train, a spacecraft, a space station, a satellite, a submarine, an automobile, a power plant, a bridge, a theater, a house, a manufacturing facility, a building, or other suitable platforms.

As another example, panel 210 may have one or more devices in addition to device 232. For example, panel 210 may include an electromechanical latch as a first device and an organic light emitting diode display as a second device. As yet another example, additional layers of conductive adhesives may be added to form additional electrodes for one or more batteries in addition to the battery formed by first conductive adhesive 220, second conductive adhesive 226, and dielectric insulator 230.

Figure 4:
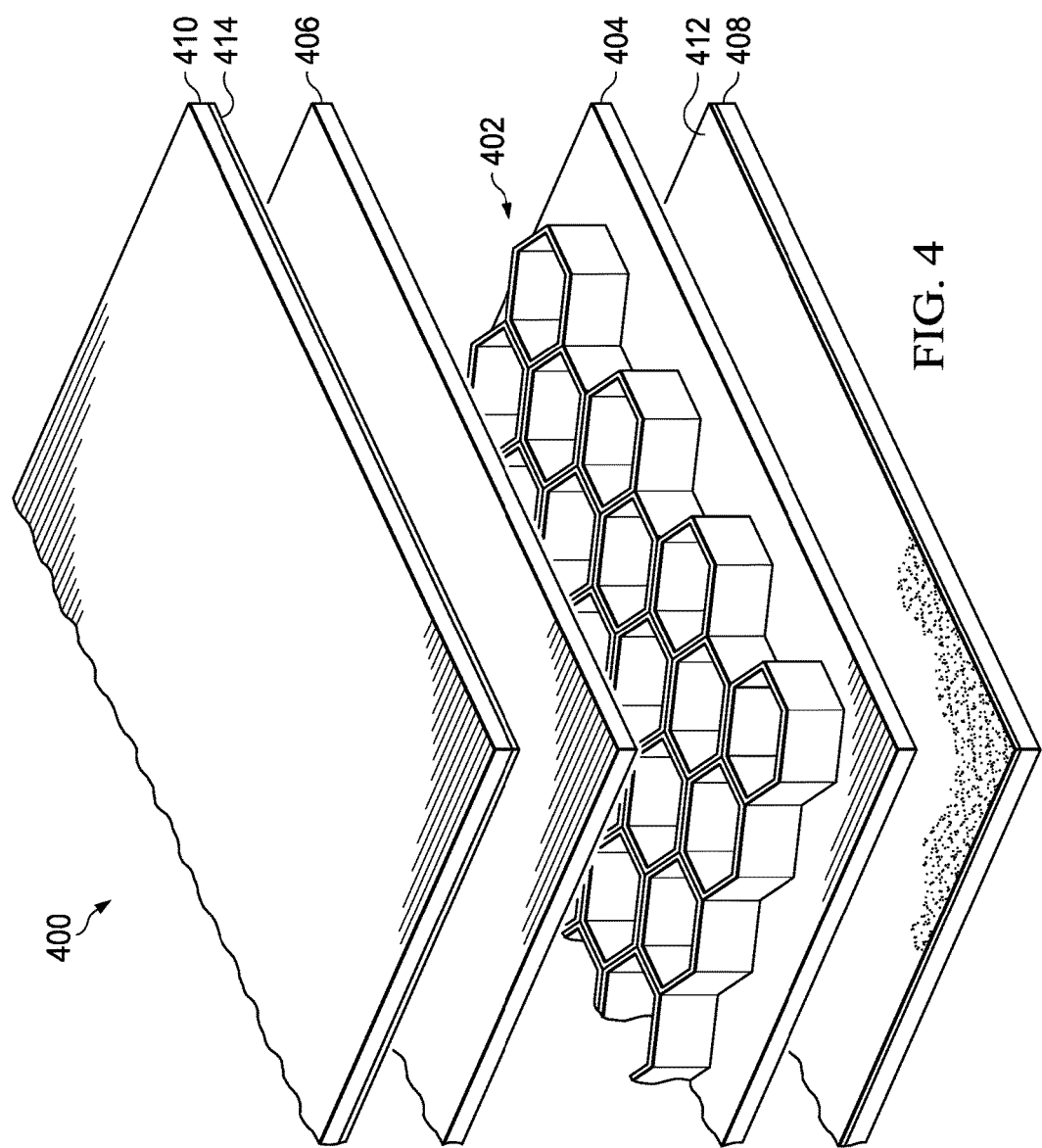
FIG. 4 is an illustration of a panel in accordance with an illustrative embodiment.
Figure 5:
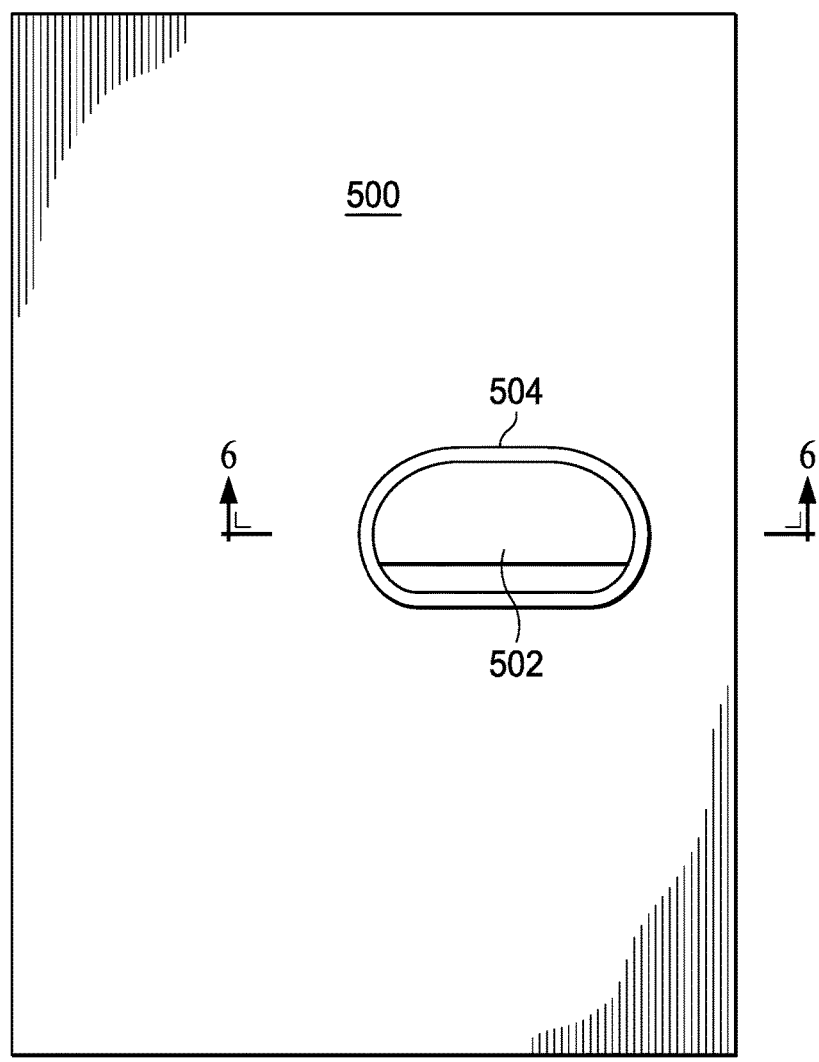
FIG. 5 is an illustration of a panel with a device in accordance with an illustrative embodiment.
Figure 6:
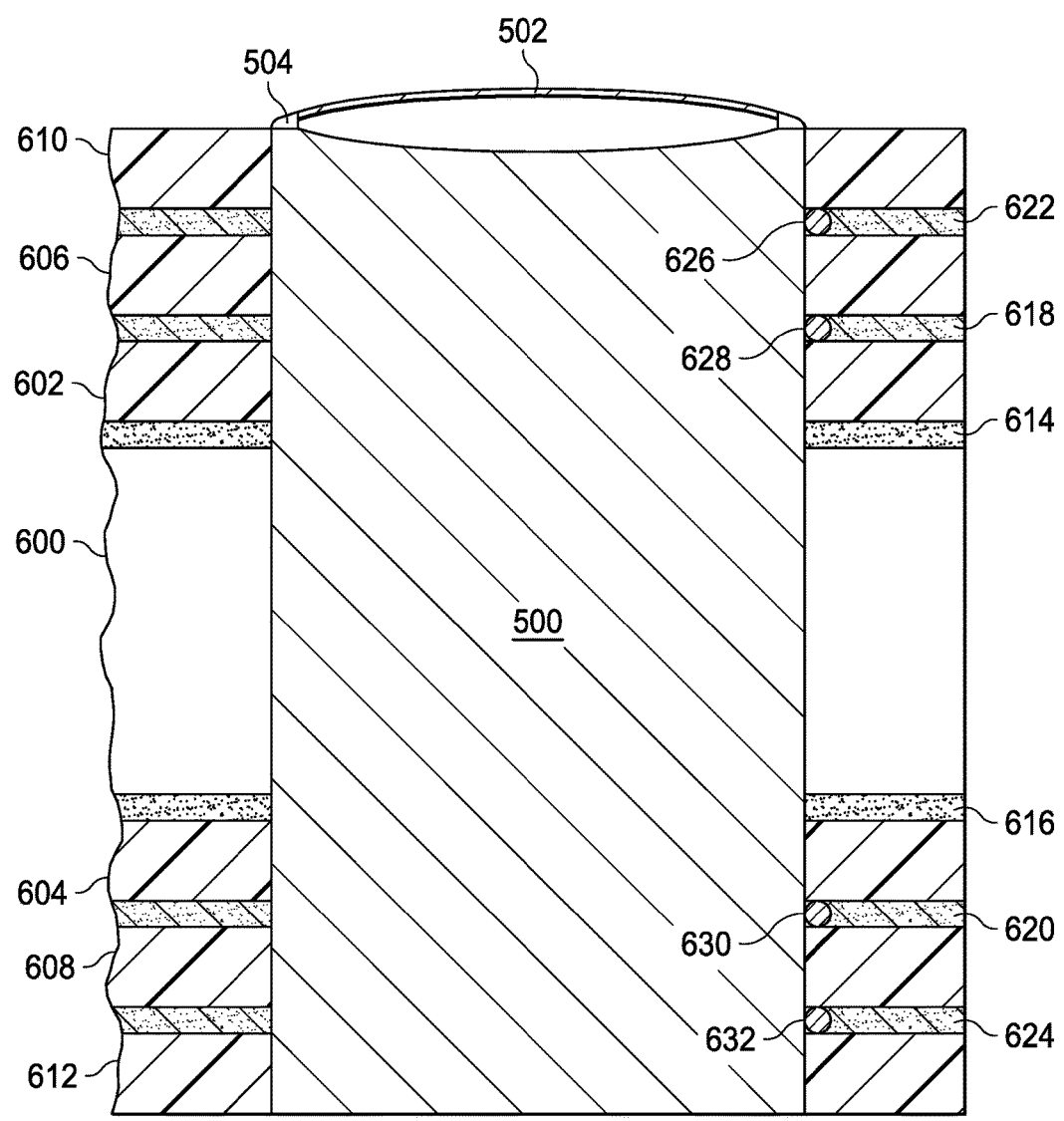
FIG. 6 is an illustration of a cross-sectional view of a panel with a device in accordance with an illustrative embodiment.

FIGS. 4-6 are illustrations of some implementations for panel 210 shown in block form in FIG. 2 and FIG. 3. With reference first to FIG. 4, an illustration of a panel is depicted in accordance with an illustrative embodiment. As depicted, panel 400 is an example of one implementation of panel 210.

In this illustrative example, panel 400 includes honeycomb core 402, inner sheet 404, inner sheet 406, outer sheet 408, and decorative laminate 410. Outer sheet 408 has conductive adhesive 412, and decorative laminate 410 has conductive adhesive 414.

Honeycomb core 402 is an example of an implementation of honeycomb core 300 shown in block form in FIG. 3. Outer sheet 408 is an example of an implementation of first sheet 214, and decorative laminate 410 is an example of an implementation of second sheet 216 shown in block form in FIG. 2 and FIG. 3. Conductive adhesive 412 is an example of an implementation of first conductive adhesive 220, and conductive adhesive 414 is an example of an implementation for second conductive adhesive 226 shown in block form in FIG. 2 and FIG. 3.

In this illustrative example, honeycomb core 402 may be constructed from cardboard, plastic, or some other suitable material. Inner sheet 404 and inner sheet 406 may each be made of one or more layers of composite materials.

For example, inner sheet 404 and inner sheet 406 each may be comprised of a number of layers of fabric that are impregnated with a resin. The fabric may, for example, be formed from a fiber made of at least one of fiberglass, carbon, graphite, a para-aramid synthetic fiber, or some other suitable type of material.

As depicted, honeycomb core 402 is constructed to function as a dielectric insulator. Conductive adhesive 412 forms a first electrode, and conductive adhesive 414 forms a second electrode. In this manner, panel 400 also functions as a battery in addition to a structural component.

The construction of panel 400 does not require additional layers of materials. Conductive adhesive 412 and conductive adhesive 414 are used in place of adhesives normally used for a panel.

Turning next to FIG. 5, an illustration of a panel with a device is depicted in accordance with an illustrative embodiment. In this illustrative example, panel 500 is an example of one implementation of panel 210 shown in block form in FIG. 2 and FIG. 3. Electromechanical latch 502 is an example of an implementation of device 232 shown in block form in FIG. 2.

In this illustrative example, panel 500 is a door for a cabinet. Electromechanical latch 502 may operate to lock and unlock the door formed by panel 500. Additionally, electromechanical latch 502 also includes light 504.

In this illustrative example, panel 500 supplies electrical power to electromechanical latch 502. For example, panel 500 may supply electrical current to electromechanical latch 502. The current is supplied using a battery integrated as part of panel 500.

Turning next to FIG. 6, an illustration of a cross-sectional view of a panel with a device is depicted in accordance with an illustrative embodiment. In this depicted example, a cross-sectional view of panel 500 is shown taken along lines 6-6 in FIG. 5.

In this illustrative example, panel 500 includes honeycomb core 600. As depicted, honeycomb core 600 is constructed in a manner to function as a dielectric insulator.

Panel 500 also includes inner sheet 602, inner sheet 604, inner sheet 606, inner sheet 608, decorative laminate 610, and decorative laminate 612. Panel 500 also includes adhesive 614, adhesive 616, conductive adhesive 618, conductive adhesive 620, conductive adhesive 622, and conductive adhesive 624.

As depicted, adhesive 614 is located between inner sheet 602 and honeycomb core 600 and attaches inner sheet 602 to honeycomb core 600. Adhesive 616 is located between inner sheet 604 and honeycomb core 600. Adhesive 616 attaches inner sheet 604 to honeycomb core 600.

In the illustrative example, conductive adhesive 618 is located between inner sheet 602 and inner sheet 606. Conductive adhesive 618 attaches inner sheet 606 to inner sheet 602. Conductive adhesive 620 is located between inner sheet 604 and inner sheet 608. Conductive adhesive 620 attaches inner sheet 608 to inner sheet 604.

Conductive adhesive 622 is located between inner sheet 606 and decorative laminate 610. Conductive adhesive 622 attaches decorative laminate 610 to inner sheet 606. Conductive adhesive 624 is located between inner sheet 608 and decorative laminate 612. Conductive adhesive 624 attaches decorative laminate 612 to inner sheet 608.

In this view, electromechanical latch 502 has contact 626, contact 628, contact 630, and contact 632. These contacts electrically connect electromechanical latch 502 and light 504 to conductive adhesive 618, conductive adhesive 620, conductive adhesive 622, and conductive adhesive 624.

As depicted, conductive adhesive 618 and conductive adhesive 620 form a first set of electrodes for a first battery, while conductive adhesive 622 and conductive adhesive 624 form a second set of electrodes for a second battery. For example, the first battery may operate electromechanical latch 502, while the second battery may provide power to operate light 504.

The illustration of panels with integrated batteries in FIGS. 4-6 are provided as examples of some implementations of panel 210 shown in block form in FIG. 2 and FIG. 3. These illustrations are not meant to limit the manner in which other illustrative examples may be implemented.

For example, panel 400 in FIG. 4 and panel 500 in FIG. 5 are examples of implementations of panel 210 that are shown as being substantially planar. In other illustrative examples, a panel may have other shapes. For example, the panel may be curved, angled, or have some other suitable shape. Further, the panel also may include protrusions, indentations, groups, or other features in other illustrative examples.

Figure 7:
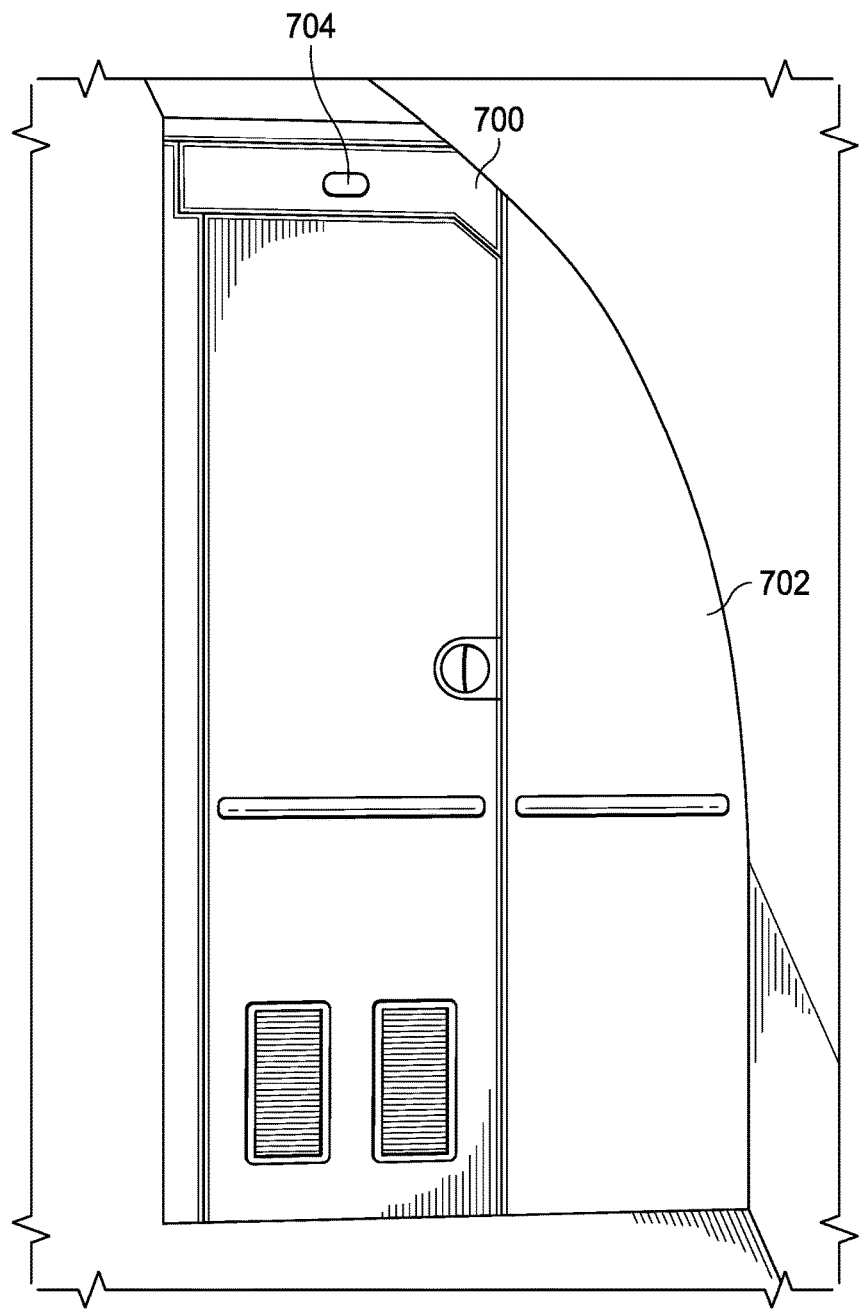
FIG. 7 is an illustration of a composite panel used in a wall in an aircraft in accordance with an illustrative embodiment.
Figure 8:
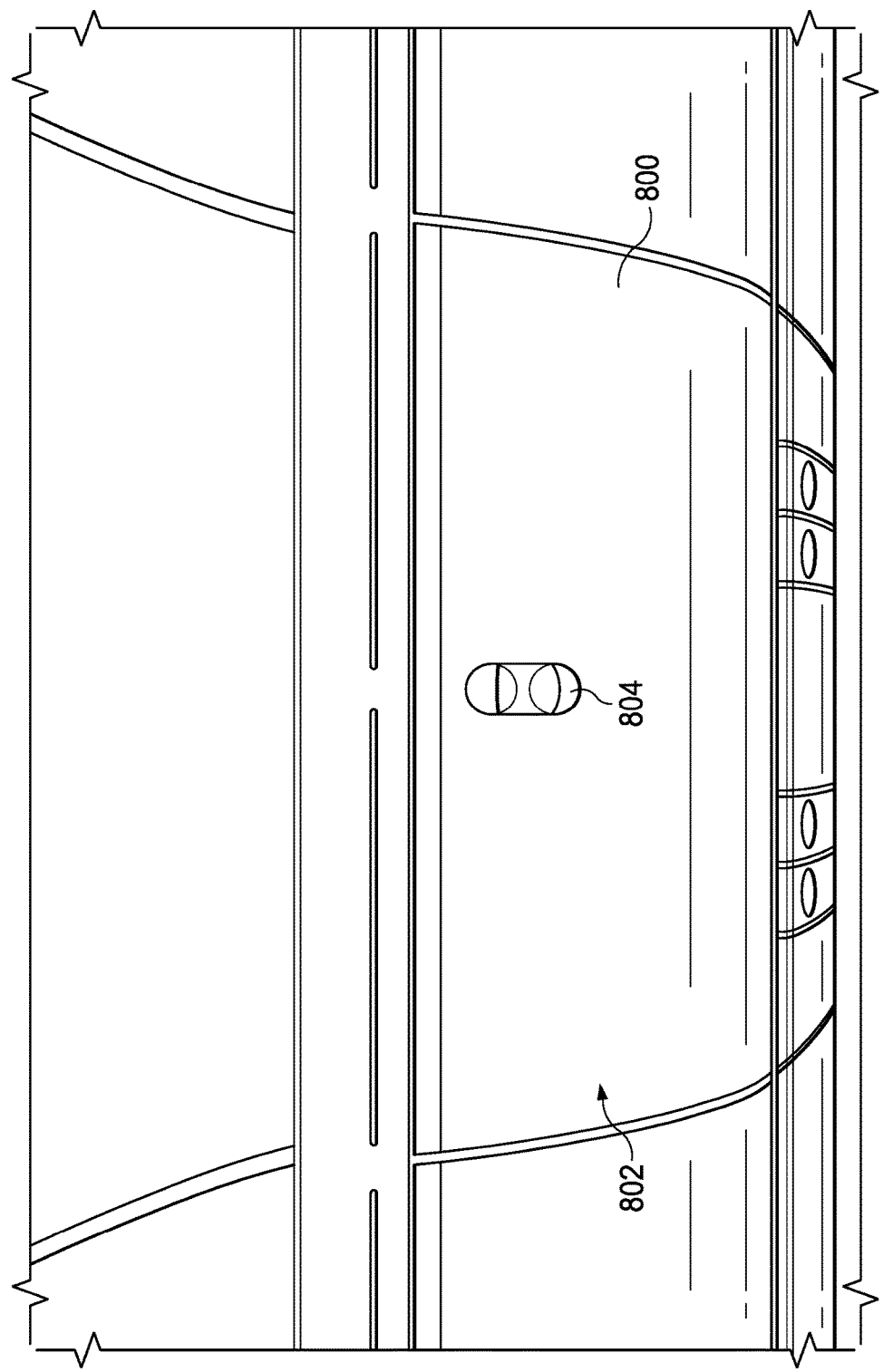
FIG. 8 is an illustration of a composite panel used in a storage in an aircraft in accordance with an illustrative embodiment.
Figure 9:
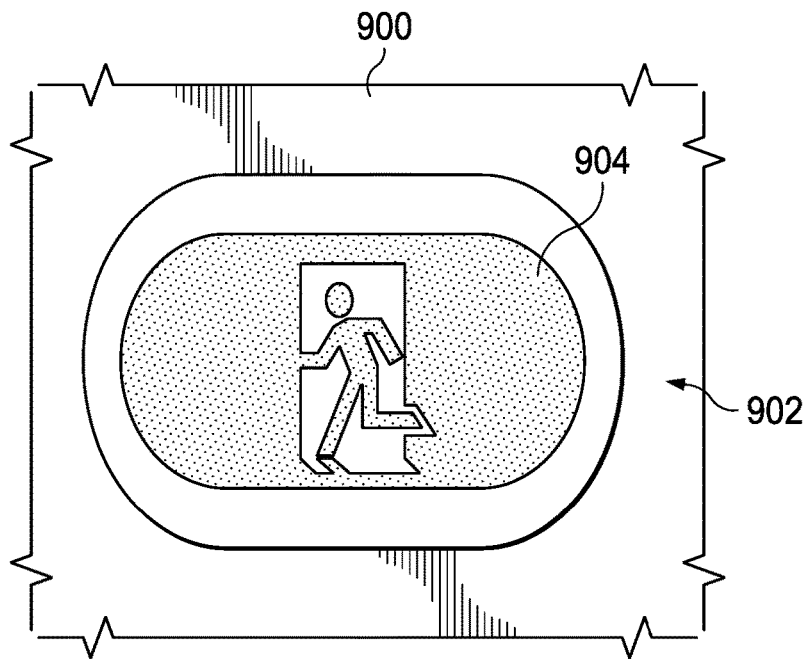
FIG. 9 is an illustration of a composite panel used in a wall in an aircraft in accordance with an illustrative embodiment.

FIGS. 7-9 are illustrations of parts in which panels may be used. These figures show examples of how panel 210 for use in parts 206, shown in block form in FIG. 2 in FIG. 3, may be implemented.

With reference to FIG. 7, an illustration of a composite panel used in a wall in an aircraft is depicted in accordance with an illustrative embodiment. As depicted, composite panel 700 is part of the wall for lavatory 702 inside the interior of an aircraft. As depicted in this illustrative example, composite panel 700 includes light 704. Composite panel 700 also includes an integrated battery (not shown) that provides power to operate light 704 and may have components similar to those in panel 210 shown in block form in FIG. 2 and FIG. 3.

Turning next to FIG. 8, an illustration of a composite panel used in a storage in an aircraft is depicted in accordance with an illustrative embodiment. As depicted, composite panel 800 is part of stowage bin 802 in the interior of an aircraft. In this example, composite panel 800 includes electromechanical latch 804 for stowage bin 802. Composite panel 800 includes an integrated battery (not shown) that provides power to operate electromechanical latch 804 and may have components similar to those in panel 210 shown in block form in FIG. 2 and FIG. 3.

With reference now to FIG. 9, an illustration of a composite panel used in a wall in an aircraft is depicted in accordance with an illustrative embodiment. In this illustrative example, composite panel 900 is part of the wall for fuselage 902 of an aircraft. As depicted in this illustrative example, composite panel 900 includes signage 904. Composite panel 900 also includes an integrated battery (not shown) that provides power to light up signage 904 and may have components similar to those in panel 210 in FIG. 2 and FIG. 3.

The illustration of the composite panels and devices in FIGS. 7-9 are provided only for purposes of illustrating one manner in which panel 210 and device 232, shown in block form in FIG. 2 and FIG. 3, may be implemented. These illustrations are not meant to limit the manner in which other illustrative examples may implement panel 210 and device 232.

For example, a panel may only supply power and not include the device. The panel may include an integrated battery similar to the configuration of panel 210 in FIG. 2 and FIG. 3. This battery is integrated as part of the panel and may be connected to a device in another panel, depending upon the particular implementation.

In yet another illustrative example, at least one of the panel or the device may be used on the exterior of an aircraft. For example, the panel may be used to form a composite skin panel for the aircraft. The device may be a light or other device that uses power from the composite skin.

In still other illustrative examples, the panel with the device may be implemented in other types of platforms in addition to an aircraft. For example, a panel may be used to form a wall in the hallway of a building. A device in the form of a light may be located in the panel wall.

Figure 10:
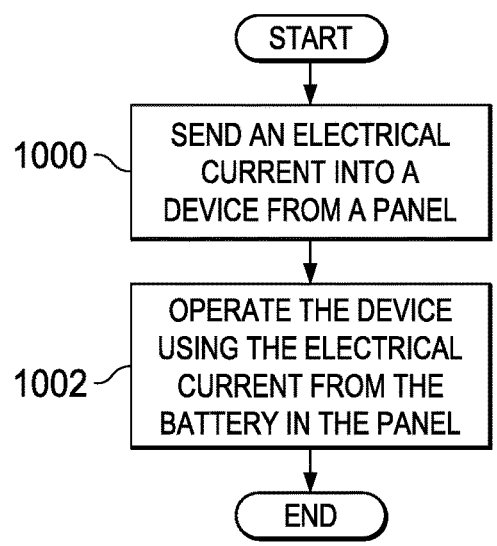
FIG. 10 is an illustration of a flowchart of a process for supplying electrical current to a device in accordance with an illustrative embodiment.

Turning next to FIG. 10, an illustration of a flowchart of a process for supplying electrical current to a device is depicted in accordance with an illustrative embodiment. The process illustrated in FIG. 10 may be implemented in battery environment 200 in FIG. 2. For example, the process may be implemented using composite panel 218 in FIG. 2.

The process begins by sending an electrical current into a device from a panel (operation 1000). In operation 1000, the panel may be implemented using panel 210 shown in block form in FIG. 2 and FIG. 3. The panel has a dielectric core; a first sheet with a first conductive adhesive attaching the first sheet to a first side of the dielectric core, wherein the first conductive adhesive is a first electrode for a battery; a second sheet with a second conductive adhesive attaching the second sheet to a second side of the dielectric core, wherein the second conductive adhesive is a second electrode for the battery.

In this example, the device may be part of the panel. In other examples, the panel may be in another panel or location.

The process operates the device using the electrical current from the battery in the panel (operation 1002). The process terminates thereafter.

The flowchart and block diagrams in the different depicted embodiments illustrate the architecture, functionality, and operation of some possible implementations of apparatuses and methods in an illustrative embodiment. In this regard, each block in the flowchart or block diagrams may represent at least one of a module, a segment, a function, or a portion of an operation or step. Each block in the flowchart or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 11:
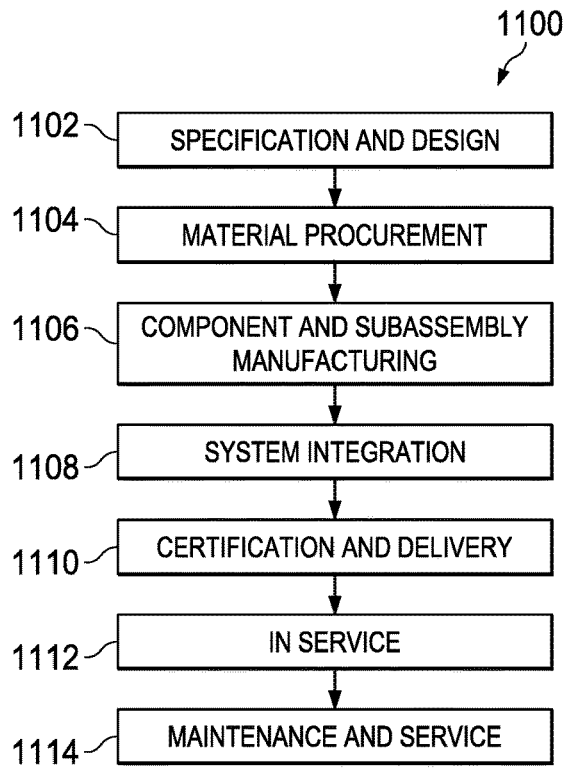
FIG. 11 is an illustration of a block diagram of an aircraft manufacturing and service method in accordance with an illustrative embodiment.
Figure 12:
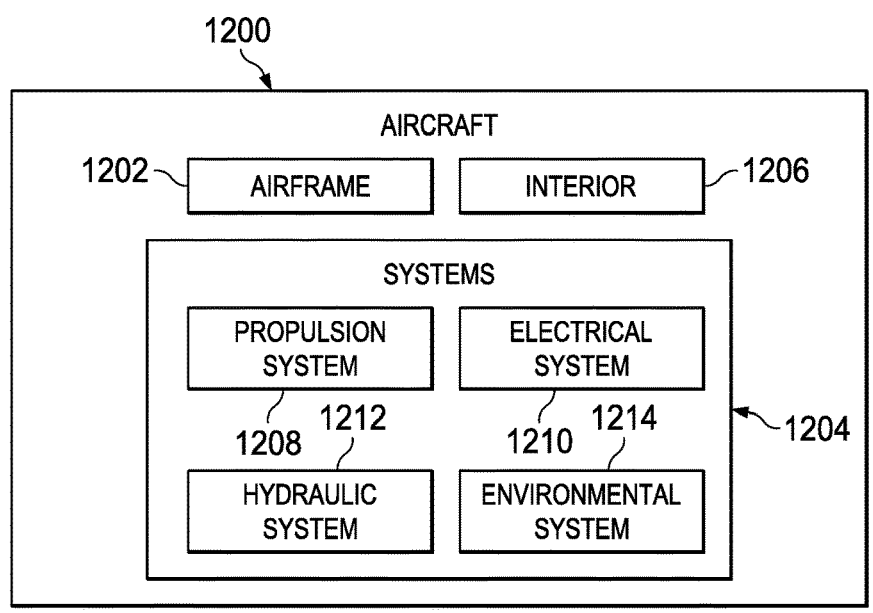
FIG. 12 is an illustration of a block diagram of an aircraft in which an illustrative embodiment may be implemented.

The illustrative embodiments of the present disclosure may be described in the context of aircraft manufacturing and service method 1100 as shown in FIG. 11 and aircraft 1200 as shown in FIG. 12. Turning first to FIG. 11, an illustration of a block diagram of an aircraft manufacturing and service method is depicted in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 in FIG. 12 takes place. Thereafter, aircraft 1200 may go through certification and delivery 1110 in order to be placed in service 1112. While in service 1112 by a customer, aircraft 1200 is scheduled for routine maintenance and service 1114, which may include modification, reconfiguration, refurbishment, and other maintenance or service.

Each of the processes of aircraft manufacturing and service method 1100 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of a block diagram of an aircraft is depicted in which an illustrative embodiment may be implemented. In this example, aircraft 1200 is produced by aircraft manufacturing and service method 1100 in FIG. 11 and may include airframe 1202 with plurality of systems 1204 and interior 1206. Examples of systems 1204 include one or more of propulsion system 1208, electrical system 1210, hydraulic system 1212, and environmental system 1214. Any number of other systems may be included. Although an aerospace example is shown, different illustrative embodiments may be applied to other industries, such as the automotive industry. Apparatuses and methods embodied herein may be employed during at least one of the stages of aircraft manufacturing and service method 1100 in FIG. 11.

In one illustrative example, components or subassemblies produced in component and subassembly manufacturing 1106 in FIG. 11 may be fabricated or manufactured in a manner similar to components or subassemblies produced while aircraft 1200 is in service 1112 in FIG. 11. For example, a panel containing an integrated battery, such as panel 210 shown in block form in FIG. 2 and FIG. 3, may be manufactured during any of these different stages of aircraft manufacturing and service method 1100 in aircraft 1200.

As yet another example, one or more apparatus embodiments, method embodiments, or a combination thereof may be utilized during production stages, such as component and subassembly manufacturing 1106 and system integration 1108 in FIG. 11. One or more apparatus embodiments, method embodiments, or a combination thereof may be utilized while aircraft 1200 is in service 1112, during maintenance and service 1114 in FIG. 11, or both.

For example, panel 210 shown in block form in FIG. 2 and FIG. 3 may be manufactured to replace a panel or refurbishment of aircraft 1200 during maintenance and service 1114. As another example, panel 210 is manufactured during component and subassembly manufacturing 1106 to manufacture aircraft 1200. When installed in aircraft 1200, panel 210 may operate to supply power in the form of electrical current while in service 1112.

The use of a number of the different illustrative embodiments may substantially expedite the assembly of aircraft 1200, reduce the cost of aircraft 1200, or both expedite the assembly of aircraft 1200 and reduce the cost of aircraft 1200. For example, the use of panel 210, shown in block form in FIG. 2 and FIG. 3, reduces wiring that may be needed to connect devices to the power system in aircraft 1200. Additionally, the use of panel 210 also may decrease the need of an upgraded power system or additional power supplies within the power system.

As a result, at least one of weight, manufacturing time, or complexity of manufacturing of aircraft 1200 may be reduced. As a result, one or more of the technical solutions described herein overcome a technical problem with providing power to devices associated with panels in an aircraft.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a dielectric core;
    a first composite material reinforced with fiber forming a first side of a panel with a first conductive adhesive attaching the first composite material to a first side of the dielectric core, wherein the first conductive adhesive is a first electrode for a battery; and
    a second composite material reinforced with fiber forming a second side of the panel with a second conductive adhesive attaching the second composite material to a second side of the dielectric core, wherein the second conductive adhesive is a second electrode for the battery, wherein the dielectric core, the first composite material, and the second composite material form the panel.

2. The apparatus of claim 1 further comprising:
    a device electrically connected to the first electrode and the second electrode.

3. The apparatus of claim 2, wherein the device is selected from one of a light, an organic light emitting diode display panel, an electromechanical switch, and a smart glass window.

4. The apparatus of claim 1 further comprising:
    a power system electrically connected to the battery, wherein the power system charges the battery.

5. The apparatus of claim 4, wherein the power system is selected from at least one of an energy harvesting system, a second battery, or an auxiliary power source.

6. The apparatus of claim 1, wherein the dielectric core is selected from one of a honeycomb core, a solid core, and a hybrid core that has dielectric properties.

7. The apparatus of claim 1, wherein the panel forms at least part of a structure in a part selected from one of an interior wall, a ceiling, an overhead stowage bin, a door, a closet, a sidewall, a partition, and a floor.

8. The apparatus of claim 1 further comprising:
    an aircraft, wherein the panel is located in a location selected from at least one of inside or outside of the aircraft.

9. The apparatus of claim 1, wherein the panel is located in a platform selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a house, a theater, a manufacturing facility, or a building.

10. A method for supplying an electrical current, the method comprising:

sending the electrical current into a device from a panel comprising a dielectric core; a first composite material reinforced with fiber forming a first side of the panel with a first conductive adhesive attaching the first composite material to a first side of the dielectric core, wherein the first conductive adhesive is a first electrode for a battery; and a second composite material reinforced with fiber forming a second side of the panel with a second conductive adhesive attaching the second composite material to a second side of the dielectric core, wherein the second conductive adhesive is a second electrode for the battery; and operating the device using the electrical current from the battery in the panel.

11. The method of claim 10 further comprising:
charging the battery using a power system.

12. The method of claim 11, wherein the power system is selected from at least one of an energy harvesting system, a second battery, or an auxiliary power source.

13. The method of claim 10, wherein the device is connected to the first electrode and the second electrode.

14. The method of claim 10, wherein the device is selected from one of a light, an organic light emitting diode display panel, an electromechanical switch, and a smart glass window.

15. The method of claim 10, wherein the dielectric core is a honeycomb core, a solid core, or a hybrid core that has dielectric properties.

16. The method of claim 10, wherein the panel forms at least part of a structure in a part selected from one of an interior wall, a ceiling, an overhead stowage bin, a door, a closet, a sidewall, a partition, and a floor.

17. The method of claim 10, wherein the panel is located in a platform selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a house, a theater, a manufacturing facility, or a building.

18. An aircraft panel comprising:
a honeycomb core that has that has dielectric properties;
a first composite material reinforced with fiber forming a first side of the aircraft panel with a first conductive adhesive attaching the first composite material to a first side of the honeycomb core, wherein the first conductive adhesive is a first electrode for a battery; and
a second composite material reinforced with fiber forming a second side of the aircraft panel with a second conductive adhesive attaching the second composite material to a second side of the honeycomb core, wherein the second conductive adhesive is a second electrode for the battery, wherein the battery is part of a composite panel.

19. The aircraft panel of claim 18, wherein the battery is connected to a power system selected from at least one of an energy harvesting system, a second battery, or an auxiliary power source.

20. The aircraft panel of claim 18, wherein the composite panel forms at least part of a structure selected from one of an interior wall, a ceiling, an overhead stowage bin, a door, a closet, and a floor.

* * * * *